United States Patent [19]
Waldner

[11] Patent Number: 5,823,123
[45] Date of Patent: Oct. 20, 1998

[54] TRANSPORTING A PARTICULATE MATERIAL TO A DISCHARGE OPENING

[75] Inventor: Clarence Waldner, Decker, Canada

[73] Assignee: Decker Mfg., Decker, Canada

[21] Appl. No.: 690,469

[22] Filed: Jul. 25, 1996

[51] Int. Cl.[6] .................................................. F23G 5/00
[52] U.S. Cl. ...................... 110/257; 110/276; 110/327; 110/110; 198/459.3; 198/625
[58] Field of Search .................... 110/108, 110, 110/257, 258, 275, 276, 293, 327; 198/459.3, 513, 625

[56] References Cited

U.S. PATENT DOCUMENTS

| 923,404 | 6/1909 | Burger et al. | 110/276 |
|---|---|---|---|
| 2,599,840 | 6/1952 | Keele et al. | 110/108 |
| 2,895,590 | 7/1959 | Snow | 198/459.3 |
| 4,299,177 | 11/1981 | Mros | 110/110 X |

FOREIGN PATENT DOCUMENTS

| 520421 | 4/1940 | United Kingdom | 110/275 |
|---|---|---|---|
| 83/00911 | 3/1983 | WIPO | 110/258 |

*Primary Examiner*—Henry A. Bennett
*Assistant Examiner*—Susanne C. Tinker
*Attorney, Agent, or Firm*—Adrian D. Battison; Murray E. Thrift

[57] ABSTRACT

In a combustion system for particulate fuel including a combustion chamber with an opening at the base of the combustion chamber and a vertical discharge duct pushing the particulate fuel through the opening there is provided a hopper spaced from the combustion chamber and a transportation duct for carrying the particulate fuel from hopper to the discharge duct. In the transportation duct there is provided an auger shaft with a first long auger flight rotated to carry the material from the hopper to the discharge duct. A second shorter flight is arranged on a side of the discharge duct opposite to the hopper in a short tube portion and is rotated in the direction to feed the material back toward the discharge duct. The two flight portions cooperate in pushing the material into the vertical discharge duct as the shaft of the flight is rotated.

2 Claims, 2 Drawing Sheets

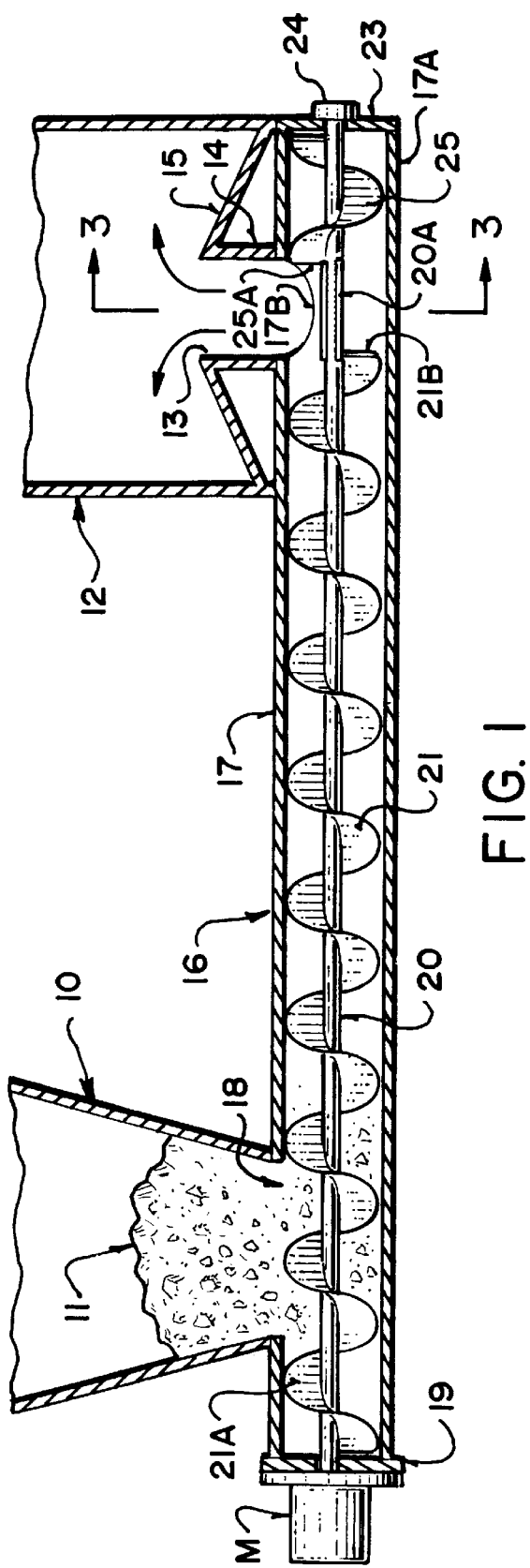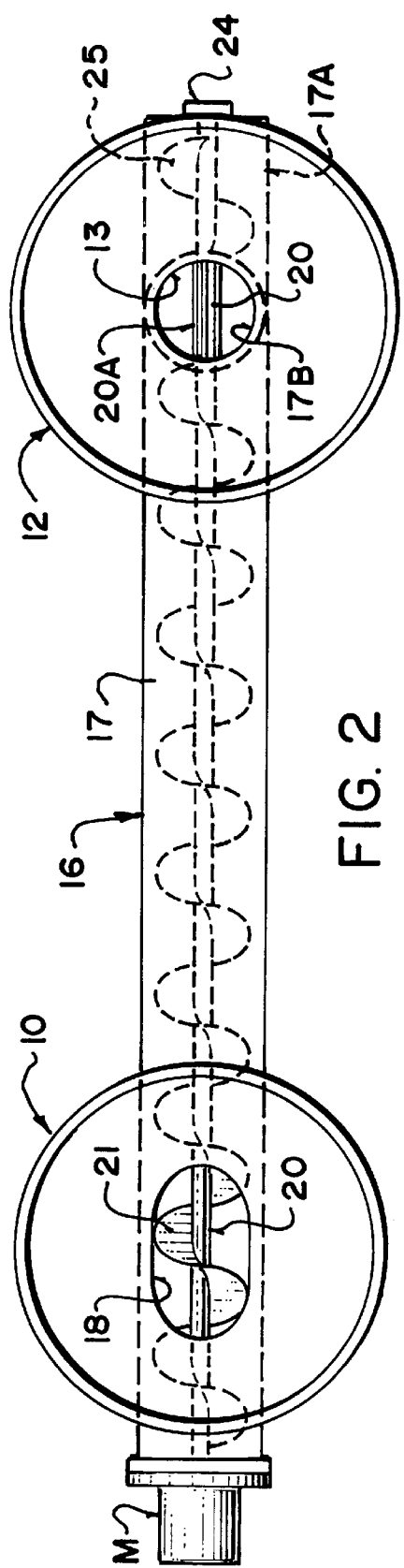

TRANSPORTING A PARTICULATE MATERIAL TO A DISCHARGE OPENING

BACKGROUND OF THE INVENTION

This invention relates to an apparatus for transporting particulate material from a hopper along a transportation duct to a discharge duct arranged at right angles to the transportation duct with a discharge opening at a remote end of the discharge duct. Such apparatus is particularly but not exclusively designed for use in a burner for particulate fuel such as coal in which the discharge duct extends vertically upwardly from the transportation duct thus releasing the particulate material from an upper open end of the discharge duct for combustion within a combustion chamber.

Coal burning apparatus of this general type is well known and includes a coal stoker generally of the above type in which a hopper discharges downwardly into the transportation duct with auger flight for transporting the particulate coal along the transportation duct to the vertically upwardly extending discharge duct which extends into the combustion chamber of the furnace.

At the end of the transportation duct at the furnace, there is provided an elbow which is attached to the discharge end of the transportation duct so that the particulate material carried along the transportation duct is forced upwardly by turning through 90 degrees at the elbow so as to be driven upwardly into the furnace.

This arrangement has had some disadvantages and difficulties in properly feeding the particulate coal fuel through the discharge duct into the furnace. While in theory the particulate material should turn through the 90 degree bend to move upwardly, in practice this has been difficult to achieve and there has been some crushing of the coal pieces in the area between the end of the auger flight and the side wall of the elbow. The particulate material from which the present invention is particularly concerned is coal which is not supplied in very small particulate of dust particles but is in larger chunks which are more affective for combustion due to the larger spaces necessary between the chunks into which the air can flow more readily.

SUMMARY OF THE INVENTION

It is one object of the present invention to provide an improved apparatus for transporting such particulate material for movement to the discharge opening.

According to the invention, therefore, there is provided an apparatus for transporting particulate material to a discharge opening comprising: a substantially horizontal transportation duct having a first end a second end; a hopper for discharging the particulate material into the transportation duct adjacent said first end for transportation there along; a discharge duct having one end attached to the transportation duct adjacent to but spaced from the second end of the transportation duct leaving a free portion of the transportation duct between the discharge duct and the second end and extending therefrom in a direction substantially at right angles thereto; the discharge duct having said discharge opening at an end thereof opposite said one end; and an auger mounted in the transportation duct for transporting the particulate material therealong including a shaft extending along the transportation duct, a first flight portion mounted on the shaft for rotation therewith and extending from the hopper to the discharge duct and arranged such that rotation of the shaft in a drive direction tends to move the particulate material toward the discharge duct and a second flight portion mounted on the shaft for rotation therewith and extending from the discharged duct into the free portion, the second flight portion being arranged such that rotation in the drive direction tends to move particulate material from the second end of the transportation duct toward the discharge duct whereby the particulate material is driven toward the discharge duct and forced into the discharge duct to the discharge opening.

Preferably the discharge duct extends vertically upwardly from the transportation duct to an upper opening forming the discharge opening.

Preferably the shaft is free from the flight portions at a portion thereof aligned with the discharge duct.

Preferably the shaft includes a plurality of projecting members thereon at angularly spaced positions therearound for rotation therewith at the portion aligned with the discharged duct.

Preferably the projecting portions each comprise a rod attached to the shaft on an outside surface thereof extending axially thereof.

Preferably the apparatus is arranged for burning the particulate material as fuel and includes a combustion chamber into which the discharge opening discharges.

One embodiment of the invention will now be described in conjunction with the accompanying drawings in which:

BRIEF DESCRIPTION OF THE DRAWINGS

FIG. 1 is a vertical cross sectional view through the apparatus of the present invention.

FIG. 2 is a top plan view of the apparatus itself, FIG. 1.

In the drawings like characters of reference indicate corresponding parts in the different figures.

DETAILED DESCRIPTION

Figure 3:
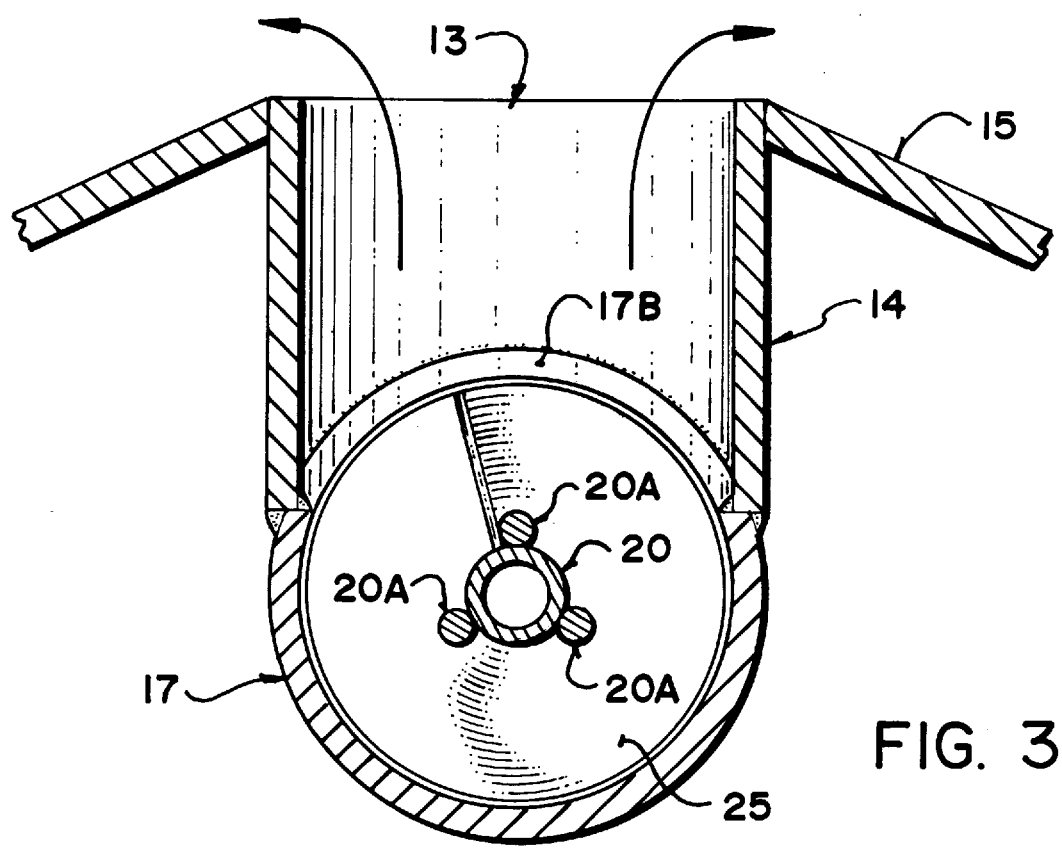
FIG. 3 is a cross sectional view along the lines 33 of FIG. 1.

An apparatus for burning coal is shown in the figure and comprises a hopper 10 containing a particulate fuel 11 which is, for example, coal in the form of chunks as opposed to a very fine particulate of dust form. The apparatus further includes a combustion chamber 12 in which the coal is burnt. The shape and arrangement of the combustion chamber is shown only schematically since this is well known to one skilled In the art and commercial arrangements are available for purchase from the present assignees.

The combustion chamber 12 is fed from below through a circular discharge opening 13 so the material moves vertically upwardly through a discharge duct 14 to the upper mouth of the duct forming the discharge opening and onto a support surface 15 on which the combustion occurs.

The particulate fuel is transported from the hopper to the discharge duct 14 through a transportation duct 16. The transportation duct 16 comprises a horizontal tube 17 having an opening 18 connected to a base of the hopper 10. The tube extends beyond the hopper to an end flange 19 to which is attached a motor M for driving an auger shaft 20 which extends along the full length of the tube 17 and carries an auger flight 21. The auger flight 21 extends from a feed end 21A underlying the hopper to a discharge end 21B at the discharge duct 14.

In general, therefore, the motor is arranged to drive the shaft in a direction causing the flight 21 to carry the particulate fuel from the hopper to the discharge duct. This arrangement for transportation of the fuel to the combustion chamber is well known and has been widely used up until now.

The present invention provides an improvement for effecting transfer of the particulate fuel from the transportation duct 16 into the discharge duct 14 for feeding through the discharge opening 13 for combustion.

In the improvement, therefore, the tube 17 is arranged so that It extends beyond the discharge duct 14 to an end portion 17a which is relatively short but provides an open portion of the tube from the adjacent edge of the discharge duct 14 to an end plate 23 carrying bearing 24 for the end of the shaft 20. Within the end portion 17A of the tube 17 is provided a second flight section 25 which is carried on the shaft 20 for rotation there with and provides at least one turn of the flight. The flight 25 is arranged relative to the direction of rotation of the shaft so as to tend to feed material from the end plate 23 toward the discharge duct 14. Each of the flights 21 and 25 terminates at an edge of the flight which is vertical and is substantially axially aligned with those portions of the duct 14 which lie on a vertical central plane of the tube 17.

The discharge duct 14 is of course a short length of tube which is shaped at its lower end to extend over the top surface of the tube 17 so the lower edge of the tube 14 follows the cylindrical surface of the tube 17. A hole is cut in the tube 17 which matches the contact of the lower edge of the tube 14 with the tube 17 and the tube 14 is then welded at its lower edge to the edge of the opening indicated at 17B. The end edges of the flights 21 and 25 which are indicated 21B and 25A respectively. These terminate at positions aligned at the edges of the duct 14 so that underneath the duct 14 there is no flight portion and the shaft is therefore exposed. In order to assist in causing movement in the material between the two flight portions underneath the duct 14, the shaft carries a plurality of projections which are conveniently a plurality of rods parallel to the shaft and welded to the shaft at angularly spaced position there around. Thus as shown in FIG. 3 there are 3 such rods 20A which are thus carried with the shaft as it rotates and thus impact on the particular material sitting on the shaft or around the shaft.

In operation, therefore, the flight 21 operates as previously described to carry the particulate fuel from the hopper to the discharge duct 14 however at the discharge duct the particulate material sits in effect in a pool underneath the discharge duct and tends to spread into the portion 17A of the tube 17. When the shaft is rotated the flight portions tend to sweep the pool of the particulate material toward the open lower end of the discharge duct and to push the material into the discharge duct for movement upwardly within the discharge duct. This double pushing action from the two flight portions provides an effective movement of the material In the discharge duct so that it is carried upwardly without the necessity for additional lifting elements actually in the discharge ducts. The projections on the shaft in the area underneath the discharge duct tend to vibrate or move the particulate material to prevent jamming and to assist in this upward pushing movement. In this way the particulate material is effectively moved upwardly the discharge duct to the mouth 13 without jamming or crushing the particulate material thus allowing the chunks to remain effectively intact.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A combustion apparatus comprising:

a combustion chamber;

a substantially horizontal transportation tube having a first feed end and a second end;

a hopper for discharging a particulate fuel material into the transportation tube at said first feed end for transportation therealong;

a substantially vertical discharge tube having a bottom end attached to the transportation tube and a top end communicating with the combustion chamber for feeding the particulate fuel material from the transportation tube upwardly into the combustion chamber;

the discharge tube being connected to the transportation tube at a position thereon adjacent to but spaced from the second end of the transportation tube leaving a free portion of the transportation tube between the discharge tube and the second end;

the transportation tube being closed along its length from the feed end to the discharge duct;

an auger mounted in the transportation tube for transporting the particulate material therealong including a shaft extending along the transportation tube, a first flight portion mounted on the shaft for rotation therewith and extending from the hopper to the discharge tube and arranged such that rotation of the shaft in a drive direction tends to move the particulate material toward the discharge tube and a second flight portion mounted on the shaft for rotation therewith and extending from the discharge tube into the free portion, the second flight portion being arranged such that rotation in the drive direction tends to move particulate material from the second end of the transportation tube toward the discharge tube whereby the particulate material is driven toward the discharge tube and forced into the discharge tube to the combustion chamber;

the first flight portion and the second flight portion each having an end thereof located at a respective point on the shaft which point is substantially axially aligned with a respective edge of the discharge tube, which edges lie in an imaginary vertical center plane of the transportation tube, such that the shaft has a portion thereof directly underneath and aligned with the discharge tube that is wholly free from the first and second flight portions;

said portion of the shaft carrying a plurality of radially outwardly projecting members thereon at angularly spaced positions around the shaft for rotation therewith, the projecting members being fixed relative to the shaft and located wholly within the transportation tube below the discharge tube and outside the combustion chamber, for engaging and agitating the particulate fuel material in the transportation tube and for assisting feeding of the particulate fuel material from the transportation tube into the combustion chamber.

2. The apparatus according to claim 1 wherein the projecting members each comprise a rod attached to the shaft on an outside surface thereof extending axially along the shaft.

* * * * *